United States Patent
Gortsas (10) Patent No.: US 11,072,332 B2
(45) Date of Patent: Jul. 27, 2021

(54) METHOD FOR A PILOT VEHICLE

(71) Applicant: Robert Bosch GmbH, Stuttgart (DE)

(72) Inventor: Nikolaos Gortsas, Sindelfingen (DE)

(73) Assignee: Robert Bosch GmbH, Stuttgart (DE)

( * ) Notice: Subject to any disclaimer, the term of this patent is extended or adjusted under 35 U.S.C. 154(b) by 372 days.

(21) Appl. No.: 16/164,464

(22) Filed: Oct. 18, 2018

(65) Prior Publication Data

US 2019/0143984 A1 May 16, 2019

(30) Foreign Application Priority Data

Nov. 15, 2017 (DE) .......................... 102017220329.3

(51) Int. Cl.
*B60W 30/18* (2012.01)

(52) U.S. Cl.
CPC ... *B60W 30/18163* (2013.01); *B60W 2554/00* (2020.02)

(58) Field of Classification Search
CPC ........ B60W 30/18163; B60W 2554/00; G08G 1/096791; G08G 1/096708; G08G 1/162; G08G 1/167
See application file for complete search history.

(56) References Cited

U.S. PATENT DOCUMENTS

| | | | | |
|---|---|---|---|---|
| 8,194,998 B2* | 6/2012 | Saito | ................. | G06K 9/00825 |
| | | | | 382/274 |
| 8,311,720 B2* | 11/2012 | Pelosse | ................. | B60W 30/16 |
| | | | | 701/96 |
| 9,771,070 B2* | 9/2017 | Zagorski | .............. | G05D 1/0289 |
| 10,745,007 B2* | 8/2020 | Zhang | ................. | B60W 30/17 |
| 2009/0228184 A1* | 9/2009 | Ueyama | ................ | B60W 30/16 |
| | | | | 701/96 |
| 2015/0070194 A1* | 3/2015 | Jo | .......................... | G08G 1/167 |
| | | | | 340/905 |

FOREIGN PATENT DOCUMENTS

DE 102014008980 A1 11/2014

* cited by examiner

*Primary Examiner* — Thomas Ingram
(74) *Attorney, Agent, or Firm* — Norton Rose Fulbright US LLP; Gerard Messina (57) ABSTRACT

A method for a pilot vehicle for influencing a passing maneuver of at least one second vehicle approaching the pilot vehicle, including the steps: detecting surroundings of the pilot vehicle; identifying a passing intention of the at least one second vehicle; detecting at least one third vehicle on a passing trajectory of the at least one second vehicle; ascertaining and selecting at least one passing maneuver of the at least one second vehicle as a function of the at least one detected third vehicle. The method provides for the emission of at least one signal for controlling the at least one selected passing maneuver. Alternatively provided is a method for a second vehicle for influencing a planned passing maneuver of the second vehicle or a method for a third vehicle for influencing a planned passing maneuver of a second vehicle.

14 Claims, 5 Drawing Sheets

METHOD FOR A PILOT VEHICLE

RELATED APPLICATION INFORMATION

The present application claims priority to and the benefit of German patent application no. 10 2017 220 329.3, which was filed in Germany on Nov. 15, 2017, the disclosure which is incorporated herein by reference.

FIELD OF THE INVENTION

The present invention relates to a method for a pilot vehicle for influencing a passing maneuver of at least one second vehicle approaching the pilot vehicle, to a computer program which is configured to carry out the steps of the method of the pilot vehicle, and to a device for a pilot vehicle. The present invention furthermore relates to a method for a second vehicle, to a computer program which is configured to carry out the steps of the method of the second vehicle, and to a device for a second vehicle. The present invention furthermore relates to a method for a third vehicle, to a computer program which is configured to carry out the steps of the method of the third vehicle, and to a device for a third vehicle.

BACKGROUND INFORMATION

Patent document DE 10 2014 008 980 A1 discusses a method for the collision prevention of vehicles in passing situations with oncoming traffic, in which a vehicle monitors an oncoming vehicle. In such a method, a start of a passing maneuver of a vehicle following the monitoring vehicle is detected by the monitoring vehicle, the collision risk of a following vehicle with the oncoming vehicle being estimated by the monitoring vehicle, and a risk-mitigating reaction of the monitoring vehicle being triggered upon establishment of the collision risk.

SUMMARY OF THE INVENTION

The present invention is directed to a method for a pilot vehicle for influencing a passing maneuver of at least one second vehicle approaching the pilot vehicle. The method includes the steps of detecting surroundings of the pilot vehicle; identifying a passing intention of the at least one second vehicle; detecting at least one third vehicle on a passing trajectory of the at least one second vehicle; and ascertaining and selecting at least one passing maneuver of the at least one second vehicle as a function of the at least one detected third vehicle.

According to the present invention, the method includes the further step of emitting at least one signal for controlling the at least one selected passing maneuver.

The pilot vehicle may be a stationary vehicle. The pilot vehicle may, in particular, be a parked vehicle. The pilot vehicle may be parked along the roadside, for example, or be double parked. The pilot vehicle may detect its surroundings with the aid of a detection unit, for example. The data collected thereby may be processed in an evaluation unit of the detection unit. The data collected thereby may also be processed in a control unit of the pilot vehicle. In this way, a second vehicle may be identified. The passing intention of the at least one second vehicle may be identified, for example, based on an activated turn signal of the second vehicle. As an alternative, the passing intention of the at least one second vehicle may be identified based on an information signal which was received with the aid of a receiving unit of the pilot vehicle for receiving radio-based signals. Based on the data collected with the aid of the detection unit, a third vehicle may also be identified.

The second vehicle is, in particular, a vehicle which at least intermittently exhibits an automated driving operation. The second vehicle may approach one side of the pilot vehicle. The second vehicle may approach the rear side of the pilot vehicle. The second vehicle may approach the front side of the pilot vehicle. The second vehicle may approach the pilot vehicle from the side.

The third vehicle is, in particular, a vehicle which at least intermittently exhibits an automated driving operation. The third vehicle may be situated on a traffic lane adjoining the second vehicle. The third vehicle may be oncoming traffic of the second vehicle. At the point in time of its detection, the third vehicle may be situated on a passing trajectory of the at least one second vehicle. At the point in time of its detection, the third vehicle may alternatively still be situated aside from the passing trajectory of the at least one second vehicle. In this alternative, it may be identified during the detection of the third vehicle that the third vehicle will be situated on the passing trajectory of the at least one second vehicle in the near future.

Depending on where the third vehicle is situated at the point in time of its detection, the second vehicle has different passing maneuvers available. If the third vehicle, for example, is already situated on the passing trajectory of the second vehicle, that passing maneuver may be ascertained and selected in which the second vehicle initially stops and passes the pilot vehicle only when the third vehicle has left the passing trajectory again. Alternatively, the third vehicle may have been detected, but is not yet situated on the passing trajectory of the second vehicle. In this case, that passing maneuver may be ascertained and selected in which the time period required for the passing maneuver is shorter than the time period until the third vehicle will be situated on the passing trajectory of the second vehicle.

The advantage of the present invention is that the pilot vehicle is able to control how a second vehicle passes the pilot vehicle. The passing maneuver of the second vehicle may be carried out in an automated manner without driver intervention. The method may be of interest, for example, when the second vehicle wants to pass a pilot vehicle which is double parked. In particular, the method offers advantages when the double parked pilot vehicle is a commercial vehicle, such as a delivery van, a garbage collection truck or a bus which, due to its size, impedes the visibility of the second vehicle. The passing maneuver of a second vehicle which is in an automated driving operation may be significantly facilitated. The passing maneuver of the second vehicle may be rendered safer.

In one advantageous embodiment of the present invention, it is provided that the method includes the further step of reading in a start signal for starting the method. An appropriate start signal may be generated and read in, for example, when an occupant of the pilot vehicle actuates a device for starting the method. An appropriate start signal may also be generated and read in when a parked state of the pilot vehicle is identified with the aid of a system of the pilot vehicle. The advantage of this embodiment is that the method may be started immediately after the pilot vehicle has been halted or parked. The pilot vehicle, which actually impedes the visibility of a second vehicle during its passing maneuver, may advantageously support the passing maneuver of the second vehicle.

In one further advantageous embodiment of the present invention, it is provided that the at least one signal for controlling the at least one selected passing maneuver is a control signal for controlling a driving operation of the at least one second vehicle. The advantage of this embodiment is that the pilot vehicle may specifically support the second vehicle in its passing maneuver. For example, the control signal for controlling the driving operation of the second vehicle may be such that the second vehicle is stopped. This may, in particular, be the case when a third vehicle is detected which is already situated on the passing trajectory of the second vehicle. Alternatively, the control signal for controlling the driving operation of the second vehicle may be such that the second vehicle carries out a passing maneuver. This may be the case, for example, when a third vehicle was detected which will be situated on the passing trajectory of the second vehicle only in the near future. If the time period until the third vehicle will be situated on the passing trajectory of the second vehicle is greater than the time period which is required for the passing maneuver, the second vehicle may safely carry out its passing maneuver. The time period until the third vehicle will be situated on the passing trajectory of the second vehicle may be ascertained, for example, from a distance of the third vehicle from the pilot vehicle and from an instantaneous speed of the third vehicle. The distance of the third vehicle and the instantaneous speed of the third vehicle may be detected, for example, with the aid of the detection unit of the pilot vehicle.

In one further advantageous embodiment of the present invention, it is provided that at least one second signal for controlling the at least one selected passing maneuver is emitted. The at least one second signal for controlling the at least one selected passing maneuver is a control signal for controlling a driving operation of the at least one third vehicle. The advantage of this embodiment is that the driving operation of the third vehicle may be influenced in such a way that the passing maneuver of the second vehicle is supported. For example, the control signal for controlling the driving operation of the third vehicle may be such that the third vehicle is stopped before it is situated on the passing trajectory of the second vehicle. In this way, the passing trajectory of the second vehicle may be kept clear, and the passing maneuver for the second vehicle may be supported.

In particular, the at least one signal for controlling the at least one selected passing maneuver may be a radio-based signal. A radio-based signal may be a Car2Car signal, for example. The pilot vehicle, for example, may emit a radio-based signal for controlling a driving operation of the second vehicle to the second vehicle. The pilot vehicle, for example, may emit a radio-based signal for controlling a driving operation of the third vehicle to the third vehicle. In particular, the at least one signal for controlling the at least one selected passing maneuver may be an optical signal. An optical signal may be a projection onto the road surface, for example. The pilot vehicle, for example, may emit an optical signal for controlling a driving operation of the second vehicle. The pilot vehicle may project an image onto the road surface, which may be detected by the second vehicle as a stop signal or, alternatively, as a start signal for the passing maneuver. The pilot vehicle, for example, may emit an optical signal for controlling a driving operation of the third vehicle. The pilot vehicle may project an image onto the road surface, which may be detected by the third vehicle as a stop signal or, alternatively, as a signal for starting or, alternatively, as a signal for continuing to drive.

The present invention is furthermore directed to a computer program which is configured to carry out all steps of the described method for a pilot vehicle.

The present invention is furthermore directed to a machine-readable storage medium on which the computer program for the pilot vehicle is stored.

The present invention is furthermore directed to a device for a pilot vehicle for influencing a passing maneuver of at least one second vehicle approaching the pilot vehicle. The device is configured to carry out the described method for the pilot vehicle. The device includes a detection unit for detecting surroundings of the pilot vehicle, for detecting the at least one second vehicle, and for detecting the at least one third vehicle on a passing trajectory of the at least one second vehicle. The device furthermore includes a control unit for identifying a passing intention of the at least one second vehicle, and for ascertaining and selecting at least one passing maneuver of the at least one second vehicle as a function of the at least one detected third vehicle. The device furthermore includes an emission unit for emitting at least one signal for controlling the at least one selected passing maneuver. The emission unit may be configured to emit radio-based signals. The emission unit may be configured to emit optical signals. The device may furthermore include a receiving unit for receiving radio-based signals.

A further aspect of the present invention is a method for a second vehicle for influencing a planned passing maneuver of the second vehicle, the method including the steps of detecting at least one signal of a pilot vehicle for controlling a passing maneuver of the second vehicle, and controlling a driving operation of the second vehicle. The driving operation of the second vehicle is controlled as a function of the detected signal of the pilot vehicle.

The advantage of the present invention is that the second vehicle may have a pilot vehicle support in a passing maneuver. In particular, when the visibility of the second vehicle is impaired due to a double parked pilot vehicle, the passing maneuver may be rendered safer by the support.

In one advantageous embodiment of the present invention, it is provided that the method includes the further step of emitting at least one information signal to the pilot vehicle. The second vehicle may, in particular, emit an information signal to the pilot vehicle which conveys a passing intention of the second vehicle to the pilot vehicle. The information signal may be emitted as a radio-based signal, for example.

The present invention is furthermore directed to a computer program which is configured to carry out all steps of the described method for a second vehicle.

The present invention is furthermore directed to a machine-readable storage medium on which the computer program for the second vehicle is stored.

The present invention is furthermore directed to a device for a second vehicle for influencing a planned passing maneuver of the second vehicle, which is configured to carry out the described method. The device for the second vehicle includes a detection unit for detecting at least one signal of a pilot vehicle for controlling a passing maneuver of the second vehicle. The detection unit may be configured to detect radio-based signals. The detection unit may be configured to detect optical signals. The device furthermore includes a control unit for controlling a driving operation of the second vehicle as a function of the at least one detected signal of the pilot vehicle.

In one advantageous embodiment, the device furthermore includes an emission unit for emitting at least one information signal to the pilot vehicle. The emission unit may be configured to emit radio-based signals.

A further aspect of the present invention is a method for a third vehicle for influencing a planned passing maneuver of a second vehicle, the method including the steps of detecting at least one signal of a pilot vehicle for controlling a passing maneuver of the second vehicle, and controlling a driving operation of the third vehicle. The driving operation of the third vehicle is controlled as a function of the detected signal of the pilot vehicle.

The present invention is furthermore directed to a computer program which is configured to carry out all steps of the described method for a third vehicle.

The present invention is furthermore directed to a machine-readable storage medium on which the computer program for the third vehicle is stored.

The present invention is furthermore directed to a device for a third vehicle for influencing a planned passing maneuver of the second vehicle, which is configured to carry out the described method. The device for the third vehicle includes a detection unit for detecting at least one signal of a pilot vehicle for controlling a passing maneuver of the second vehicle. The detection unit may be configured to detect radio-based signals. The detection unit may be configured to detect optical signals. The device furthermore includes a control unit for controlling a driving operation of the third vehicle as a function of the at least one detected signal of the pilot vehicle.

Exemplary embodiments of the present invention are described in greater detail hereafter based on the accompanying drawings. Identical reference numerals in the figures indicate identical or similarly acting elements.

DETAILED DESCRIPTION

Figure 1:
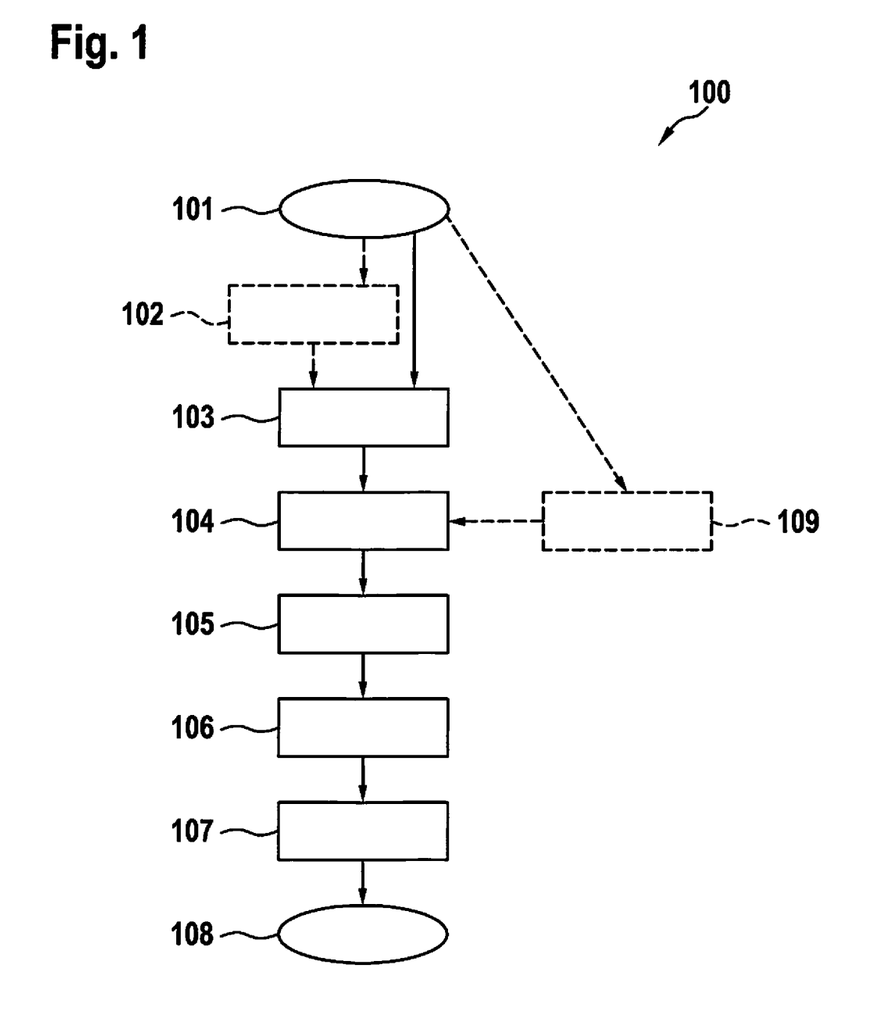
FIG. 1 shows a method for a pilot vehicle for influencing a passing maneuver of at least one second vehicle approaching the pilot vehicle.

FIG. 1, by way of example, shows method 100 for a pilot vehicle for influencing a passing maneuver of at least one second vehicle approaching the pilot vehicle. Method 100 starts in step 101.

In step 103, the surroundings of the pilot vehicle are detected with the aid of a detection unit of the pilot vehicle. Based on the collected data of the surroundings, it is possible, for example, to detect and, with the aid of an evaluation unit of the detection unit or with the aid of a control unit of the pilot vehicle, to identify at least one second vehicle approaching the pilot vehicle. In step 104, a passing intention of the at least one second vehicle is identified. The identification of the passing intention may take place, for example, based on the collected data of the surroundings. For example, the passing intention may be identified based on an activated turn signal of the at least one second vehicle. Based on the collected data of the surroundings, furthermore a possible passing trajectory of the at least one second vehicle may be ascertained. In step 105, at least one third vehicle is detected on a passing trajectory of the at least one second vehicle. The detection of the at least one third vehicle may take place, for example, based on the collected data of the surroundings. The at least one third vehicle may be detected and, with the aid of an evaluation unit of the detection unit or with the aid of a control unit of the pilot vehicle, may be identified. In step 106, at least one passing maneuver of the at least one second vehicle is ascertained and selected with the aid of a control unit of the pilot vehicle. In step 107, at least one signal for controlling the at least one selected passing maneuver is emitted. The at least one signal for controlling at least one selected passing maneuver may be a control signal for controlling a driving operation of the at least one second vehicle. In this case, the signal is emitted to a second vehicle. As an alternative, the at least one signal for controlling at least one selected passing maneuver may be a control signal for controlling a driving operation of the at least one third vehicle. In this case, the signal is emitted to a third vehicle. It is also possible to emit at least two signals in step 107, at least one control signal for controlling a driving operation of the at least one second vehicle and at least one control signal for controlling a driving operation of the at least one third vehicle being emitted. Method 100 ends in step 108.

In an optional step 102, a start signal for starting method 100 is read in at the start of method 100. An appropriate start signal may be generated and read in, for example, when an occupant of the pilot vehicle actuates a device for starting method 100. An appropriate start signal may also be generated and read in when a parked state of the pilot vehicle is identified with the aid of a system of the pilot vehicle.

In an optional step 109, an information signal may be received with the aid of a receiving unit of the pilot vehicle. This information signal may be a radio-based signal, for example. This information signal may have been emitted by the at least one second vehicle, for example. This information signal may, for example, include a piece of information about a passing intention of the at least one second vehicle.

Figure 2:
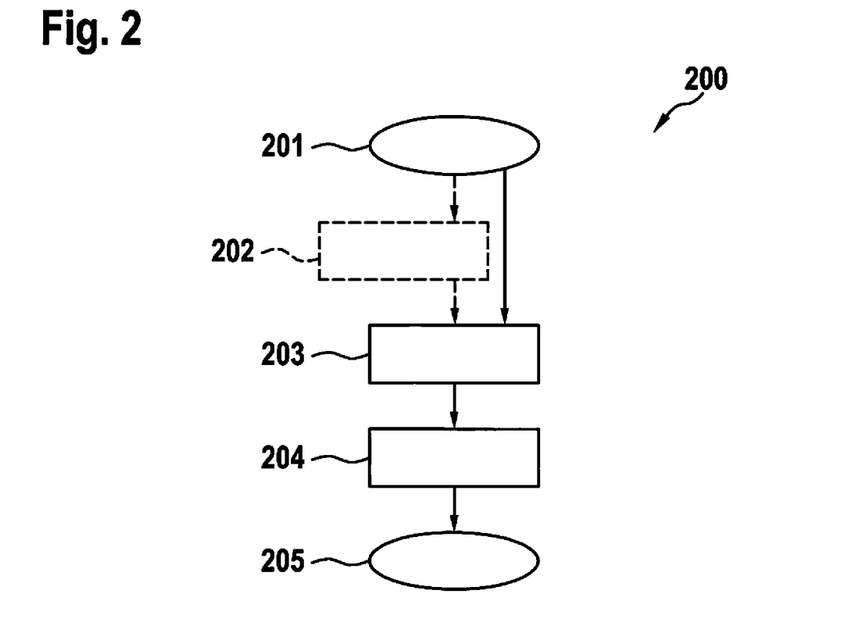
FIG. 2 shows a method for a second vehicle.

FIG. 2, by way of example, shows method 200 for a second vehicle. Method 200 starts in step 201. In step 203, at least one signal for controlling a passing maneuver of the second vehicle is detected. In step 204, a driving operation of the at least one second vehicle is controlled as a function of the detected signal. Method 200 ends in step 205. In an optional step 202, the at least one second vehicle emits an information signal to the pilot vehicle. The information signal may, for example, include a piece of information about a passing intention of the second vehicle.

Figure 3:
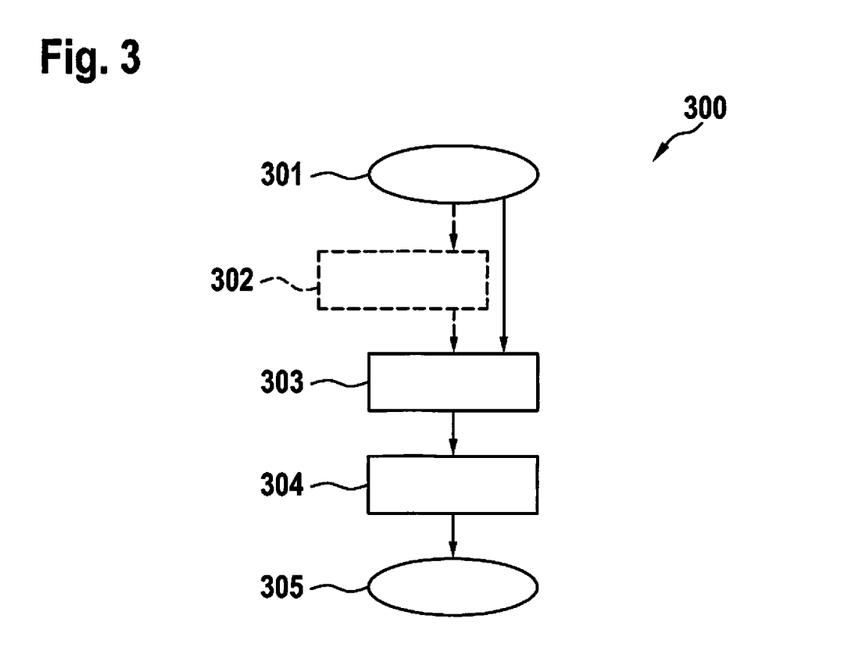
FIG. 3 shows a method for a third vehicle.

FIG. 3, by way of example, shows method 300 for a third vehicle. Method 300 starts in step 301. In step 303, at least one signal for controlling a passing maneuver of the second vehicle is detected. In step 304, a driving operation of the at least one third vehicle is controlled as a function of the detected signal. Method 300 ends in step 305. In an optional step 302, the at least one third vehicle emits an information signal to the pilot vehicle. The information signal may, for example, be a piece of information about a planned trajectory of the third vehicle.

Figure 4A:
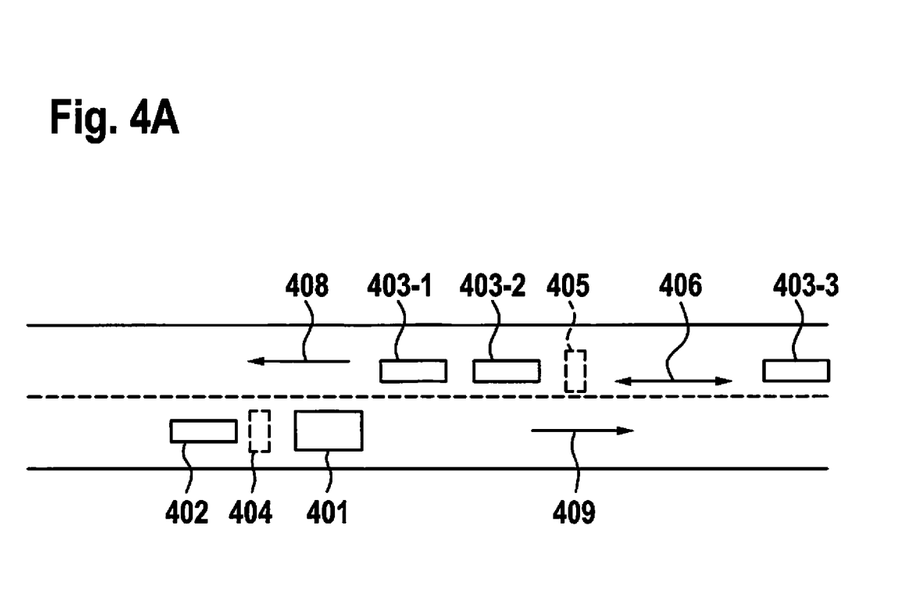
FIGS. 4A, 4B, and 4C show the sequence of passing a pilot vehicle by a second vehicle.
Figure 4B:
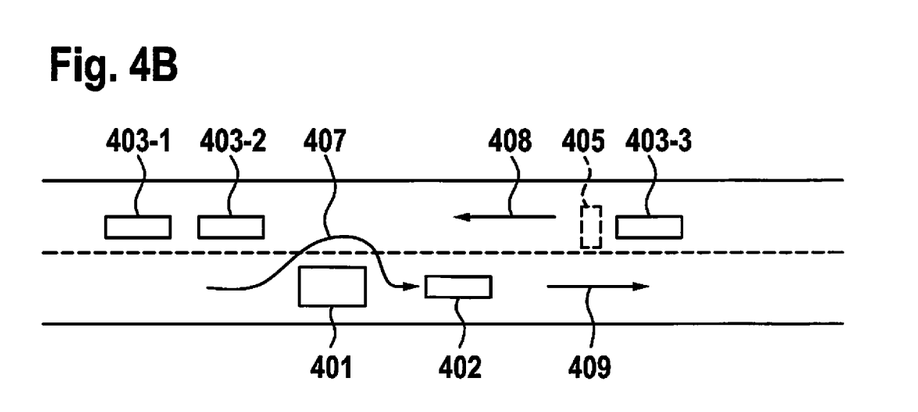
Figure 4C:
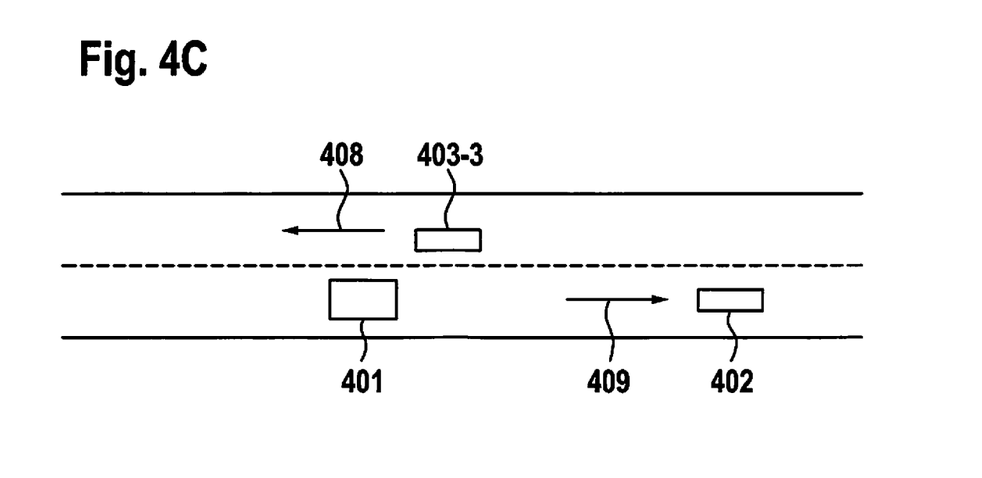

FIGS. 4A through 4C show the sequence of a passing maneuver in which pilot vehicle 401 is passed by second vehicle 402. In FIG. 4A, pilot vehicle 401 and second vehicle 402 are both situated on the traffic lane having driving direction 409 at a first point in time of the passing maneuver. Pilot vehicle 401 is situated on the traffic lane.

Pilot vehicle 401 is parked on the traffic lane. Accordingly, second vehicle 402 has a passing intention. Second vehicle 402 wants to pass pilot vehicle 401.

However, it has to expect oncoming traffic on the traffic lane having driving direction 408.

Pilot vehicle 401 may recognize that it is in the parked state, for example with the aid of a system of pilot vehicle 401. As an alternative, it is also possible for an occupant of pilot vehicle 401 to have actuated a device which allows pilot vehicle 401 to recognize that it is in the parked state. Regardless of whether or not the engine of pilot vehicle 401 is running, pilot vehicle 401 may thereupon start its function for influencing a passing maneuver of second vehicle 402.

Pilot vehicle 401 may detect its surroundings with the aid of a detection unit. In this way, it may, for example, identify approaching second vehicle 402. In this way, it may also identify the passing intention of second vehicle 402, for example by identifying an activated turn signal of vehicle 402. As an alternative or in addition, pilot vehicle 401 may also identify the passing intention of second vehicle 402 by receiving an information signal which was emitted by second vehicle 402. The received information signal may be a radio-based signal. The received information signal may include a piece of information about a passing intention of the second vehicle 402.

By detecting the surroundings, pilot vehicle 401 may furthermore identify the oncoming traffic on the traffic lane having driving direction 408, for example. On this traffic lane, it identifies third vehicle 403-1, third vehicle 403-2 and third vehicle 403-3, for example. In particular, it may identify that third vehicle 403-1 and third vehicle 403-2 represent obstacles for second vehicle 402 if second vehicle 402 were to carry out the passing maneuver in which it immediately passes pilot vehicle 401. Accordingly, pilot vehicle 401 ascertains an alternative passing maneuver for second vehicle 402. In particular if there are multiple alternative passing maneuvers, it selects one of these passing maneuvers with the aid of a control unit. In this way, pilot vehicle 401 may, for example, ascertain and select a passing maneuver in which second vehicle 402 initially stops and does not start the passing maneuver until a later point in time.

Pilot vehicle 401 emits a signal for controlling the at least one selected passing maneuver. For example, pilot vehicle 401 emits a control signal for controlling a driving operation of second vehicle 402. This control signal for controlling the driving operation of second vehicle 402 may be detected by second vehicle 402. Pilot vehicle 401 may emit a radio-based signal to second vehicle 402. As an alternative or in addition, pilot vehicle 401 may also emit an optical signal 404. Optical signal 404 may be the projection of a warning message onto the road. This optical signal 404 may be identified by a detection unit of second vehicle 402 and, for example, be interpreted as a stop sign. In second vehicle 402, the driving operation of second vehicle 402 is now controlled as a function of the at least one detected signal of pilot vehicle 401. In the case as shown in FIG. 4A, the driving operation of second vehicle 402 will be controlled in such a way that second vehicle 402 initially stops behind pilot vehicle 401.

In the present case, pilot vehicle 401 may furthermore have identified, by detecting its surroundings, that there is a sufficiently large distance 406 between third vehicle 403-2 and third vehicle 403-3, which may be used for a passing maneuver of second vehicle 402. For example, pilot vehicle 401 may now emit a control signal for controlling a driving operation of third vehicle 403-3. This control signal may be detected by third vehicle 403-3. Pilot vehicle 401 may emit a radio-based signal to third vehicle 403-3. As an alternative or in addition, pilot vehicle 401 may also emit an optical signal 405. Optical signal 405 may be the projection of a stop sign, for example, onto the road. This optical signal 405 may be identified and interpreted by a detection unit of third vehicle 403-3. In third vehicle 403-3, the driving operation of third vehicle 403-3 is now controlled as a function of the at least one detected signal of pilot vehicle 401. In the case as shown in FIG. 4A, the driving operation of third vehicle 403-3 will be controlled in such a way that third vehicle 403-3 initially stops at optical signal 405.

FIG. 4B shows a second point in time of the passing maneuver described here. Third vehicle 403-1 and third vehicle 403-2 have both passed pilot vehicle 401 at this point in time. The driving operation of third vehicle 403-3 has now been controlled in such a way that third vehicle 403-3 has stopped at optical signal 405. Pilot vehicle 401 may now emit a further control signal for controlling a driving operation of second vehicle 402 to second vehicle 402. In this way, the driving operation of second vehicle 402 is controlled in such a way that vehicle 402 starts its passing maneuver. Vehicle 402 passes pilot vehicle 401 on passing trajectory 407. When this passing maneuver, as shown in FIG. 4B, is completed, the opposite traffic lane may be cleared again by pilot vehicle 401. For this purpose, pilot vehicle 401 may emit a further signal for controlling the driving operation of third vehicle 403-3 to third vehicle 403-3.

FIG. 4C shows a third point in time of the passing maneuver described here. The driving operation of third vehicle 403-3 was controlled in such a way that third vehicle 403-3 was able to continue driving. It also passes pilot vehicle 401.

The pilot vehicle may thus actively intervene in the control of traffic. Alternatively, it could also allow only a certain number of third vehicles which are moving on the opposite traffic lane to pass. In this way, congestions in one driving direction could be avoided.

Figure 5:
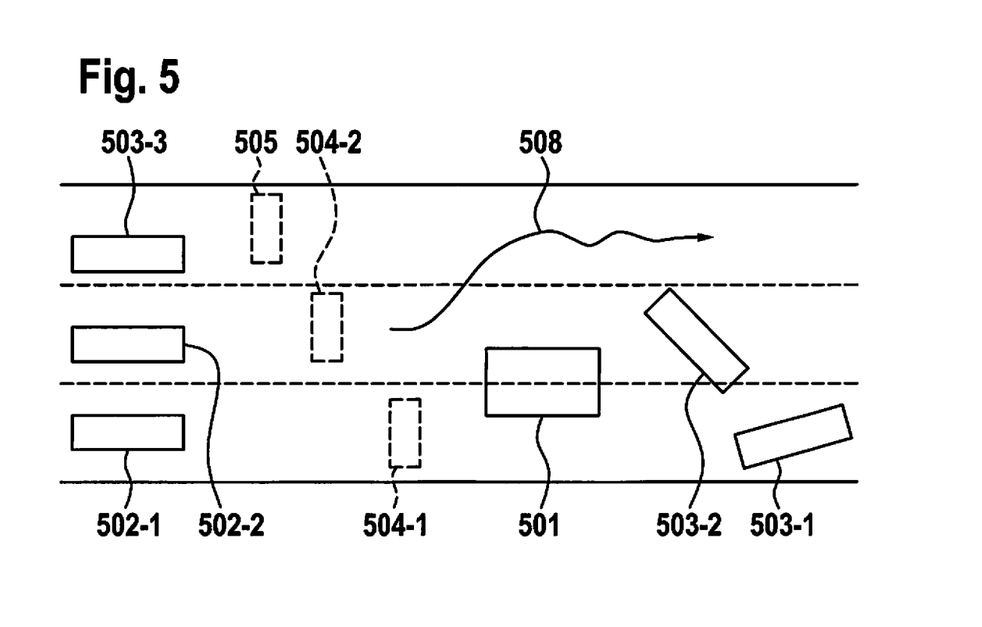
FIG. 5 shows the coordination of the passing maneuvers of multiple second vehicles with the aid of a pilot vehicle at an accident scene.

FIG. 5 shows the coordination of the passing maneuvers of second vehicles 502-1 and 502-2 with the aid of a pilot vehicle 501 at an accident scene. The situation shown here could represent an accident on a freeway. Third vehicle 503-1 and third vehicle 503-2, which were involved in the accident and now block two traffic lanes, are situated on the one side of pilot vehicle 501. Second vehicle 502-1, second vehicle 502-2 and third vehicle 503-3 are situated on the other side of pilot vehicle 501. These three vehicles are situated on three traffic lanes, all three traffic lanes being driven along the same driving direction. The traffic lane on which second vehicle 502-1 is situated is not negotiable due to the accident and due to pilot vehicle 501. Second vehicle 502-1 thus has a passing intention. The traffic lane on which second vehicle 502-2 is situated is not negotiable due to the accident and due to pilot vehicle 501. Second vehicle 502-2 thus has a passing intention. Third vehicle 503-3 is moving on a traffic lane which is clear. While driving, it passes pilot vehicle 501. If third vehicle 503-3 continues to move, however, it could be on a passing trajectory 508 of second vehicle 502-2. It could also be on a passing trajectory of second vehicle 502-1. If second vehicle 502-1 and second vehicle 502-2 were to carry out their respective passing maneuver simultaneously, these two vehicles would moreover interfere with one another. Second vehicle 502-2 could be situated on a passing trajectory of second vehicle 502-1 and interfere with the passing maneuver of second vehicle 502-1. Second vehicle 502-1 could be situated on a passing trajectory of second vehicle 502-2 and interfere with the passing maneuver of second vehicle 502-2.

To ensure safe and efficient overtaking and passing of pilot vehicle 501, pilot vehicle 501 assumes the coordination. Pilot vehicle 501 influences the passing maneuvers of second vehicle 502-1 and of second vehicle 502-2. Pilot vehicle 501 initially detects its surroundings. Based on the collected data, pilot vehicle 501 is able to detect second vehicle 502-1, second vehicle 502-2 and third vehicle 503-3. Based on the collected data, pilot vehicle 501 may furthermore identify a passing intention of second vehicle 502-1, for example. Alternatively, second vehicle 502-1 may emit its passing intention in the form of an information signal to pilot vehicle 501. This information signal may be received by pilot vehicle 501. Based on the collected data, pilot vehicle 501 may furthermore also identify a passing intention of second vehicle 502-2, for example. Alternatively, second vehicle 502-2 may emit a passing intention in the form of an information signal to pilot vehicle 501. This information signal may be received by pilot vehicle 501. Based on the collected data, pilot vehicle 501 may furthermore detect third vehicle 503-3 on a passing trajectory 508 of second vehicle 502-2. Pilot vehicle 501 is also able to detect third vehicle 503-3 on a passing trajectory of second vehicle 502-1. Based on the collected data, pilot vehicle 501 is also able to identify that second vehicle 502-1 and second vehicle 502-2 would interfere with one another during their passing maneuvers if they carry these out simultaneously.

Based on the situation in the detected surroundings, pilot vehicle 501 may now ascertain and select at least one passing maneuver. Pilot vehicle 501 may ascertain and select at least one passing maneuver as a function of the at least one detected third vehicle 503-3. Pilot vehicle 501 will, in particular, ascertain and select a passing maneuver for second vehicle 502-1 and a passing maneuver for second vehicle 502-2. By emitting at least one signal for controlling the selected passing maneuvers, pilot vehicle 501 may influence the selected passing maneuvers. By emitting at least one radio-based signal, pilot vehicle 501 may then influence the selected passing maneuvers. In addition or as an alternative, by emitting at least one optical signal, pilot vehicle 501 may influence the selected passing maneuvers. For example, by emitting a radio-based signal to second vehicle 502-1, and by emitting a radio-based signal to second vehicle 502-2, and by emitting a radio-based signal to third vehicle 503-3, it is possible to initially achieve that these three vehicles stop. In addition or as an alternative, by emitting optical signal 504-1 as a projection ahead of second vehicle 502-1, and by emitting optical signal 504-2 as a projection ahead of second vehicle 502-2, and by emitting optical signal 505 as a projection ahead of third vehicle 503-3, it is possible to achieve that these three vehicles stop. In this way, initially all three lanes are blocked. Pilot vehicle 501 may now selectively open up one of the traffic lanes at a time. It may open up one of the traffic lanes for a certain number of vehicles in each case. For example, it may initially open up the traffic lane in which second vehicle 502-1 is situated for second vehicle 502-1. For this purpose, pilot vehicle 501 emits a control signal for controlling the driving operation of second vehicle 502-1. Pilot vehicle 501 may also emit a corresponding control signal to further vehicles following second vehicle 502-1 on this traffic line. Pilot vehicle 501 may then block this traffic lane again. In the next step, for example, the traffic lane on which second vehicle 502-2 is situated is opened up. For this purpose, pilot vehicle 501 emits a control signal for controlling the driving operation of second vehicle 502-2. Pilot vehicle 501 may also emit a corresponding control signal to further vehicles following second vehicle 502-2 on this traffic lane. Once, for example, second vehicle 502-2 and possibly further vehicles have passed the accident scene along passing trajectory 508, pilot vehicle 501 may block this traffic lane again. Pilot vehicle 501 may now open up the traffic lane for third vehicle 503-3. For this purpose, pilot vehicle 501 emits a control signal for controlling the driving operation of third vehicle 503-3. Pilot vehicle 501 may also emit a corresponding control signal to further vehicles following third vehicle 503-3 on this traffic lane. As a result, pilot vehicle 501 enables an even flow of traffic for passing the accident scene.

Figure 6:
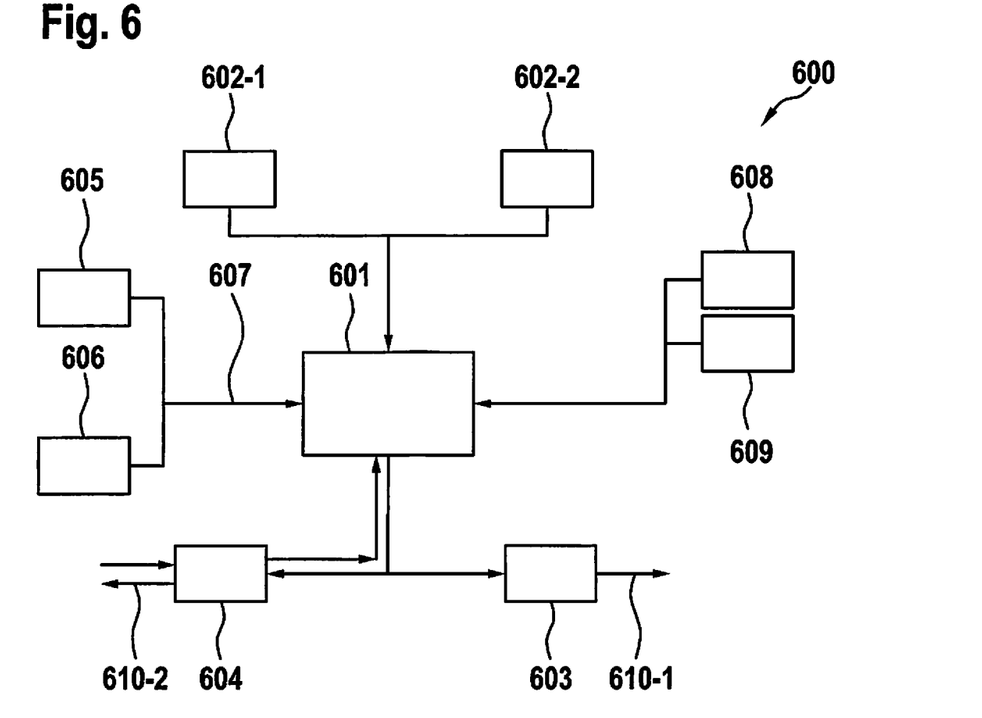
FIG. 6 shows the device for a pilot vehicle for influencing a passing maneuver of at least one second vehicle approaching the pilot vehicle.

FIG. 6, by way of example, shows a device 600 for a pilot vehicle for influencing a passing maneuver of at least one second vehicle approaching the pilot vehicle. Device 600 includes at least one detection unit 602 for detecting surroundings of the pilot vehicle. FIG. 6 shows the two detection units 602-1 and 602-2. These could each be a camera at the front of the pilot vehicle and a camera at the rear of the pilot vehicle, for example. The at least one second vehicle may be detected with the aid of the data collected by detection units 602-1 and 602-2. Furthermore, at least one third vehicle on a passing trajectory of the at least one second vehicle may also be detected based on the collected data.

Device 600 furthermore includes a control unit 601. With the aid of this control unit 601, a passing intention of the at least one second vehicle may be identified. The identification takes place, for example, based on the data collected with the aid of detection units 602-1 and 602-2. As an alternative, an information signal including a piece of information about a passing intention may have been received and transmitted to control unit 601 with the aid of transceiver 604. Control unit 601 may ascertain and select at least one passing maneuver of the at least one second vehicle as a function of the at least one detected third vehicle. With the aid of an emission unit of device 600, at least one signal 610 for controlling the at least one selected passing maneuver may be emitted. The emission unit may be a unit 603 for emitting an optical signal 610-1. The emission unit may be a unit 604 for emitting a radio-based signal 610-2. Unit 604 may, as was already mentioned above, also be configured to receive a radio-based signal.

Device 600 may furthermore include unit 605 for transmitting start signal 607. Additionally, map data may be read in with the aid of unit 608. It may be recognized, with the aid of the read-in map data, that the pilot vehicle is parked. Additionally, a GPS signal may be received with the aid of unit 609. It may be recognized, with the aid of the received GPS signal, that the pilot vehicle is parked. It may be recognized that the pilot vehicle is double parked. In this case, a start signal 607 may be transmitted to control unit 601 with the aid of unit 605. Device 601 begins to influence the passing maneuver of the at least one second vehicle.

Alternatively or additionally, device 600 may include unit 606 for transmitting start signal 607. For example, unit 606 may be actuated by an occupant. After the actuation of unit 606, start signal 607 may be transmitted to control unit 601. Device 601 begins to influence the passing maneuver of the at least one second vehicle.

What is claimed is:

1. A method for a pilot vehicle for influencing a passing maneuver of at least one second vehicle approaching the pilot vehicle, the method comprising:
    detecting, by the pilot vehicle, surroundings of the pilot vehicle;

identifying, by the pilot vehicle, a passing intention of the at least one second vehicle;
detecting, by the pilot vehicle, at least one third vehicle on a passing trajectory of the at least one second vehicle;
ascertaining and selecting, by the pilot vehicle, at least one passing maneuver to be executed by the at least one second vehicle as a function of the at least one detected third vehicle; and
emitting, by the pilot vehicle, at least one signal to the at least one second vehicle that the at least one second vehicle uses to execute the at least one selected passing maneuver selected by the pilot vehicle.

2. The method of claim 1, further comprising:
reading in a start signal for starting the method.

3. The method of claim 1, wherein the at least one signal for controlling the at least one selected passing maneuver is a control signal for controlling a driving operation of the at least one second vehicle.

4. The method of claim 1, wherein at least one second signal for controlling the at least one selected passing maneuver is emitted, and the at least one second signal for controlling the at least one selected passing maneuver is a control signal for controlling a driving operation of the at least one third vehicle.

5. A non-transitory computer readable medium having a computer program, which is executable by a processor, comprising:
a program code arrangement having program code for a pilot vehicle for influencing a passing maneuver of at least one second vehicle approaching the pilot vehicle, by performing the following:
detecting, by the pilot vehicle, surroundings of the pilot vehicle;
identifying, by the pilot vehicle, a passing intention of the at least one second vehicle;
detecting, by the pilot vehicle, at least one third vehicle on a passing trajectory of the at least one second vehicle;
ascertaining and selecting, by the pilot vehicle, at least one passing maneuver to be executed by the at least one second vehicle as a function of the at least one detected third vehicle; and
emitting, by the pilot vehicle, at least one signal to the at least one second vehicle that the at least one second vehicle uses to execute the at least one selected passing maneuver selected by the pilot vehicle.

6. A device for a pilot vehicle for influencing a passing maneuver of at least one second vehicle approaching the pilot vehicle, comprising:
at least one detection unit for detecting, by the pilot vehicle, surroundings of the pilot vehicle, for detecting, by the pilot vehicle, the at least one second vehicle, and for detecting, by the pilot vehicle, at least one third vehicle on a passing trajectory of the at least one second vehicle;
a control unit for identifying, by the pilot vehicle, a passing intention of the at least one second vehicle, and for ascertaining and selecting, by the pilot vehicle, at least one passing maneuver to be executed by the at least one second vehicle as a function of the at least one detected third vehicle; and
at least one emission unit for emitting, by the pilot vehicle, at least one signal to the at least one second vehicle that the at least one second vehicle uses to execute the at least one selected passing maneuver selected by the pilot vehicle.

7. A method for a second vehicle for influencing a planned passing maneuver of the second vehicle, the method comprising:
detecting, by the second vehicle, at least one signal emitted by a pilot vehicle via which the pilot vehicle controls a passing maneuver that the second vehicle executes in order to pass the pilot vehicle; and
controlling, by the second vehicle, a driving operation of the second vehicle as a function of the at least one detected signal of the pilot vehicle.

8. The method of claim 7, further comprising:
emitting at least one information signal to the pilot vehicle.

9. A non-transitory computer readable medium having a computer program, which is executable by a processor, comprising:
a program code arrangement having program code for influencing a planned passing maneuver of the second vehicle, by performing the following:
detecting, by the second vehicle, at least one signal emitted by a pilot vehicle via which the pilot vehicle controls a passing maneuver that the second vehicle executes in order to pass the pilot vehicle; and
controlling, by the second vehicle, a driving operation of the second vehicle as a function of the at least one detected signal of the pilot vehicle.

10. A device for a second vehicle for influencing a planned passing maneuver of the second vehicle, comprising:
a detection unit for detecting, by the second vehicle, at least one signal emitted by a pilot vehicle via which the pilot vehicle controls a passing maneuver that the second vehicle executes in order to pass the pilot vehicle; and
a control unit for controlling, by the second vehicle, a driving operation of the second vehicle as a function of the at least one detected signal of the pilot vehicle.

11. The device of claim 10, further comprising:
an emission unit for emitting at least one information signal to the pilot vehicle.

12. A method for a third vehicle for influencing a planned passing maneuver of a second vehicle, the method comprising:
detecting, by the third vehicle, at least one signal emitted by a pilot vehicle for controlling a passing maneuver of the second vehicle in which the second vehicle passes the pilot vehicle; and
controlling, by the third vehicle, a driving operation of the third vehicle as a function of the at least one detected signal emitted by the pilot vehicle.

13. A non-transitory computer readable medium having a computer program, which is executable by a processor, comprising:
a program code arrangement having program code for a third vehicle for influencing a planned passing maneuver of a second vehicle, by performing the following:
detecting, by the third vehicle, at least one signal emitted by a pilot vehicle for controlling a passing maneuver of the second vehicle in which the second vehicle passes the pilot vehicle; and
controlling, by the third vehicle, a driving operation of the third vehicle as a function of the at least one detected signal emitted by the pilot vehicle.

14. A device for a third vehicle for influencing a planned passing maneuver of a second vehicle, comprising:
a detection unit for detecting, by the third vehicle, at least one signal emitted by a pilot vehicle for controlling a passing maneuver of the second vehicle in which the second vehicle passes the pilot vehicle; and a control unit for controlling, by the third vehicle, a driving operation of the third vehicle as a function of the at least one detected signal emitted by the pilot vehicle.

* * * * *